United States Patent [19]

Aalbersberg

[11] Patent Number: 5,946,678
[45] Date of Patent: *Aug. 31, 1999

[54] USER INTERFACE FOR DOCUMENT RETRIEVAL

[75] Inventor: Ijsbrand Jan Aalbersberg, Briarcliff Manor, N.Y.

[73] Assignee: Philips Electronics North America Corporation

[*] Notice: This patent issued on a continued prosecution application filed under 37 CFR 1.53(d), and is subject to the twenty year patent term provisions of 35 U.S.C. 154(a)(2).

[21] Appl. No.: 08/371,188

[22] Filed: Jan. 11, 1995

[51] Int. Cl.⁶ ..................................................... G06F 17/30
[52] U.S. Cl. .................................. 707/3; 707/1; 707/100; 707/102; 395/779; 395/794; 395/12; 395/155; 395/157; 395/419.19
[58] Field of Search .................................. 395/600, 161, 395/613, 611, 12, 779, 794

[56] References Cited

U.S. PATENT DOCUMENTS

| | | | |
|---|---|---|---|
| 4,437,127 | 3/1984 | Hirose | 358/296 |
| 4,451,900 | 5/1984 | Mayer et al. | 364/900 |
| 4,870,568 | 9/1989 | Kahle et al. | 364/200 |
| 4,985,863 | 1/1991 | Fujisawa et al. | 364/900 |
| 4,999,790 | 3/1991 | Murayama et al. | 364/521 |
| 5,220,625 | 6/1993 | Hatakeyama et al. | 382/54 |
| 5,241,671 | 8/1993 | Reed et al. | 395/600 |
| 5,257,349 | 10/1993 | Alexander | 395/159 |
| 5,265,242 | 11/1993 | Fujisawa et al. | 395/600 |
| 5,321,833 | 6/1994 | Chang et al. | 395/600 |
| 5,418,948 | 5/1995 | Turtle | 395/600 |
| 5,488,725 | 1/1996 | Turtle et al. | 395/600 |
| 5,515,488 | 5/1996 | Hoppe et al. | 395/140 |
| 5,535,382 | 7/1996 | Ogawa | 395/600 |
| 5,537,132 | 7/1996 | Teraoka et al. | 345/133 |

FOREIGN PATENT DOCUMENTS

| | | | |
|---|---|---|---|
| 0351233 | 1/1990 | European Pat. Off. | G06F 15/403 |
| 0490625 | 6/1992 | European Pat. Off. | G06F 15/40 |
| 0510634 | 10/1992 | European Pat. Off. | G06F 15/401 |
| 0546801 | 6/1993 | European Pat. Off. | G06F 15/403 |
| 0561241 | 9/1993 | European Pat. Off. | G06F 15/40 |
| 941071086 | 7/1994 | European Pat. Off. | G06F 15/403 |
| 627691A1 | 12/1994 | European Pat. Off. | G06F 15/403 |
| WO96/21901 | 7/1996 | European Pat. Off. | G06F 17/30 |
| 774722 A2 | 5/1997 | European Pat. Off. | G06F 17/30 |

OTHER PUBLICATIONS

Pearce et al, "Experiments in a dynamic hypertext environment for degraded and multilingual data," pp. 263–265, Apr. 1996.

Elaine L. Appleton, "Smart document retrieval," Computer select, v38, n2, p20 (4), Jan. 1992.

Esther Dyson, "WAIS: many way to do it," v91, n4, p7 (8), Apr. 1991.

(List continued on next page.)

*Primary Examiner*—Thomas G. Black
*Assistant Examiner*—Jean M. Corrielus
*Attorney, Agent, or Firm*—Anne E. Barschall

[57] ABSTRACT

A user interface for a full-text document retrieval computerized system comprises a display with a words window in which each query word is displayed by means of a distinctive representation uniquely associated with each displayed word. In a subsequent results window, each document header or title or representation is accompanied by an indicator which employs the same distinctive representation to directly indicate to the user the relative contributions of the individual query words to each listed document. In a preferred embodiment, the distinctive representation is integrated with an associated weight first indicator in a words window, and in the results window the distinctive representations are also integrated with an associated weight second indicator. The distinctive representation can take several forms, such as by a different color or by means of hatching or shading or by displayed icons.

12 Claims, 5 Drawing Sheets

OTHER PUBLICATIONS

Xerox, "Document management software," pp. 1–11, Jan. 1994.

Xerox, "Visual recall press release," pp. 1–4, Apr. 1994.

Xerox, "Visual recall press release," pp. 1–4, Oct. 1995.

Folio Vlews 3.1 User's Guide "Online User's Guide & Help Infobase Version 3.1a" Folio Corporation, Jan. 1994.

"TileBars: Visualization of Term Distribution Information in Full Text Information Access", M. Hearst; Chi '95 Mosaic of Creativity Denver Colorado, USA (May 7–Nov. 1995).

"Interfaces for Searching the Web" by Marti A. Hearst; Scientific American; Special Report; pp. 1–6, Mar. 1997.

Sanderson et al., "NRT: news retrieval tool", Electronic Publishing, vol. 4, No. 4, pp. 205–217, Dec. 1991.

Shaw et al. "The Human–Computer Interface for Information Retrieval", vol. 26 Abstract, 1991.

Klingler et al. "Census Power for the Masses! A User–Friendly Interface for Census CD–ROM", May 1990, Abstract.

USER INTERFACE FOR DOCUMENT RETRIEVAL

BACKGROUND OF THE INVENTION

This invention relates to an improved user interface for a relevance-ranking, abstract or document retrieval computerized system.

Document retrieval deals with the problem of how to search for documents relevant to a user's given information need. A relevance-ranking, full-text document retrieval computerized system is the type of document retrieval system that addresses this problem by first transforming a user's information need into a query, and subsequently matching this query with the full text of all the documents in the document base that is to be searched through. The document texts are subsequently sorted on their correspondence to the query, and a higher correspondence is then considered to represent the documents that are more relevant to the given information need.

A known relevance-ranking, full-text document retrieval system described by Sanderson et al. in a paper published in Electronic Publishing, Vol, 4(4), 205–217, December 1991, entitled "NRT: news retrieval tool", the contents of which are incorporated herein, has a user interface that basically consists of a display of three parts: a query window, a results window, and a document window. In the query window, a user can enter his/her query typically in the form of multiple significant words, herein called "query words"; in the results window, s/he can see the results of the search (the result is a list of supposedly relevant documents); and in the document window, sometimes called the viewer window, the user can browse through a particular selected document. In the result window, documents are displayed in order of relevance.

Displaying for the user only these three windows does not inform the user of the underlying strategy of the retrieval system: s/he is neither able to see nor to influence which words in his/her query are taken seriously in the search and which not.

Hence, the published NRT provides to the user the weights of the query words in an additional words window. In the words window, all displayed query words are sorted on decreasing weights, while these weights are represented as sliders or as bar indicators. In this way, the user can see the weights of the query words prior to the search itself, and s/he is even able to modify the weights if necessary.

However, there is an important disadvantage of the NRT system. This disadvantage is that even those four windows are not able to give the user sufficient information as to how the query words individually contribute or relate to the documents ranked in the results window. For instance, if the query words are, for example, A and B, the user cannot see from the display whether a document listed in the results window is relevant because only A occurs in it, or because only B occurs in it, or because both A and B occur in it.

SUMMARY OF THE INVENTION

An object of the invention is an improved user interface for an abstract or document retrieval computerized system.

A further object of the invention is a relatively simple user interface for a relevance-ranking, full-text document retrieval system that indicates to the user more significant information about the documents found in the search.

According to one aspect of the invention, a user interface for an abstract or document retrieval computerized system comprises a display with a words window in which each query word is displayed in conjunction with a distinctive representation uniquely associated with each displayed word. Then, in the results window, each abstract or document header or title is accompanied by an indicator which employs the same distinctive representation to directly indicate to the user the relative contributions of the individual words from the query to each listed abstract or document.

The invention is preferably employed in connection with a relevance-ranking, full-text document retrieval computerized system.

In a preferred embodiment, the distinctive representation is integrated with an associated weight first indicator in a words window, and in the results window the distinctive representations are also integrated with an associated weight second indicator, in which the extent of the respective distinctive representations immediately informs the user of the relative contribution or relevance of each of the query words in an associated document.

The distinctive representation can take several forms. In a color display system, the most preferred distinctive representation is by a different color. In a black and white system, the distinctive representation can be by means of hatching or shading or by displayed icons. The latter three distinctive representations can also be used in a color system.

Preferably, the first and second indicators are sliders or bars, in which case the length of the respective distinctive representations along the slider or bar indicates the relative relevance of each of the query words in the document.

It will be understood that for such systems one can include in the words window in the same line all words having a common stem, in which case the relative relevance applies to all words with the same stem. Hence, when discussing the application of the invention to particular instances, even though only one word of a possible set of many words having the same stem is listed, it should be kept in mind that relative relevance in a document is typically computed with respect to the set of words having the same stem, referred to herein as the "word variant equivalence class".

For the preferred use of color as the distinctive representation, for the example given above of A and B query words, next to each document listed in the results window would be a multi-colored bar of which one color represents the A word and a different color the B word, and of which the total length indicates the total supposed relevance of the document, and in which the individual colored parts of the bar immediately show the relative relevance of each of the A and B words to the document.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, similar reference numerals indicating similar components or entities.

DETAILED DESCRIPTION OF THE PREFERRED EMBODIMENTS

The usability of the user interface of the invention is basically in relevance-ranking, text retrieval computerized systems, both stand-alone and on-line systems. The invention also extends beyond that to other systems where full-text document retrieval techniques can be used. For example, systems including, but not limited to, CD-I, video-on demand systems, multi-media, and on-line interactive services. Also, other types of retrieval systems, such as speech retrieval and image retrieval, could also benefit from the invention. However, since the most common use is a user sitting at a PC or workstation having access to a document base and a retrieval engine and wanting to retrieve documents relevant to certain query words, the invention will be described in the context of such a system.

Figure 1:
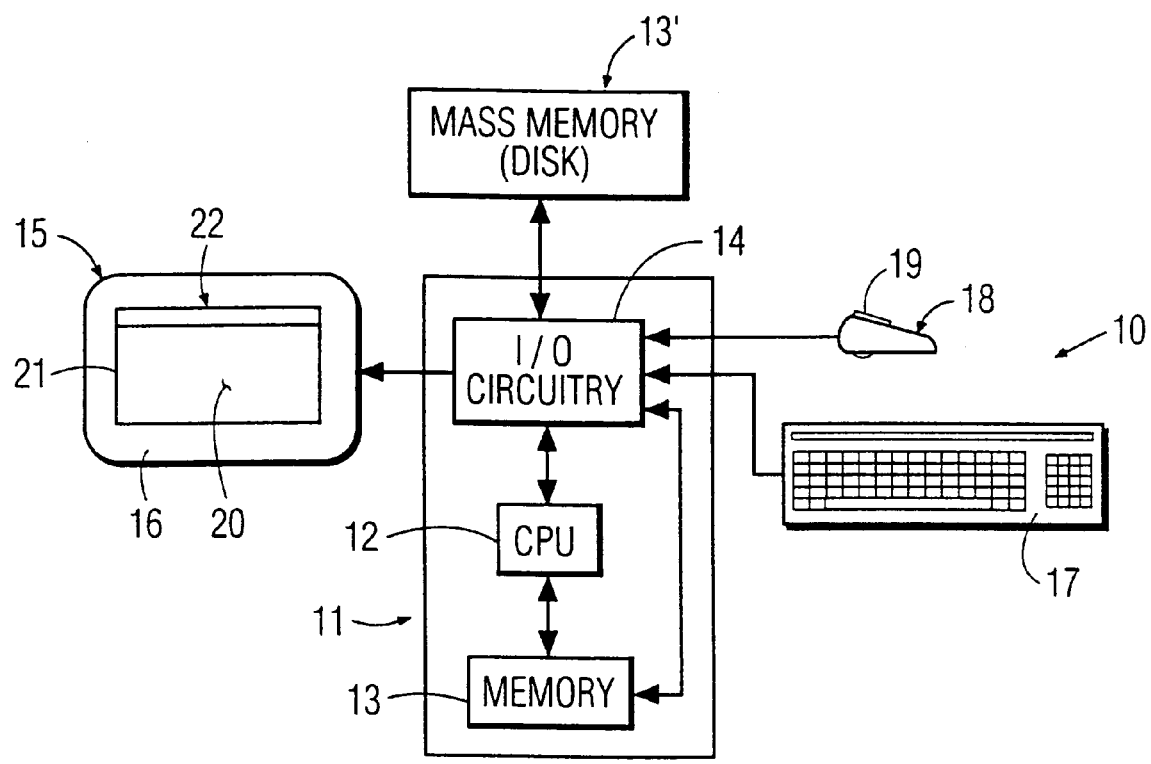
FIG. 1 is a block diagram of a typical computer system for use in a relevance-ranking, full-text document retrieval system.

FIG. 1 shows a typical computerized system 10 that can be employed using the invention, comprising a console 11 containing a CPU 12, memory 13, 13' in the form of RAM, ROM and disk, and I/O circuitry 14 connected to a monitor 15 having a display screen 16, and control devices in the form of a keyboard 17 and a mouse 18. The mouse 18 typically contains button switches 19 operated by a user of the system. A cursor or pointer 20 is typically displayed on the screen 16 and its position is controllable via the mouse 18 or the keyboard 17 as is well known. A typical window 21 is displayed on the screen 16, with a title bar 22 in the window.

The following terms used herein will have the following meanings.

"Window" means a portion of a computer screen used to display information and as used herein includes a pane.

"Control device" means devices manipulated by users to move cursers around a screen, and include a mouse and keyboard.

"Pointing" to an object on screen means actuating the control device to move the cursor so that it is over or adjacent the object. When the cursor is a pointer such as an arrow, it means moving the arrow tip close to the object.

"Clicking" on an object means to press and quickly release a switch on the control device, such as a button on a mouse, when the cursor is pointing to the object.

"Dragging" means to click on the object, and while holding the switch activated, to manipulate the control device to move the object to a new screen location, and then to release the switch to drop it on another object or to fix the new screen location of the object.

"Select" is the action of choosing an object or other user interface element, such as an icon. The action of selecting may be performed with the mouse, or through the keyboard.

A "slider" is a representation of a control device for use with a mouse. A button on a slider can sometimes be moved between its ends, and whose location on the slider corresponds to a parameter of the information of the current view.

"Icon" means any screen image or representation which signifies some parameter of importance of information available to a user.

All of the foregoing actions described above are implemented, as is well known, under control of the computer 11, and specifically the CPU 12, by a series of software routines which are part of the operating system and which are invoked by keyboard commands, or, with a GUI, more usually by clicking on or dragging an object. The operating system knows at all times the location of the screen cursor, and routines are selected and invoked to be run by the location of the cursor when the mouse is clicked or double-clicked or released and by the state of the system. So, for example, positioning the cursor over an item displayed and clicking will select the item, if the system state allows this action.

The invention features, associated with existing windows, the provision of new, user-interface displays for the purpose of greatly enhancing the ability of a user to understand the significance of documents found by a search engine in response to actions by the user applied via the keyboard or mouse in a relevance-ranking, full-text document retrieval computerized system. As described at length in the referenced Electronic Publishing paper, a user would typically have access via a system of the type shown in FIG. 1 to a document base and a retrieval engine for searching and selecting documents that match by some criteria query words inputted by the user. The type of criteria used is not important to the invention, and known document bases use various forms of criteria for selecting documents. For purposes of the present invention, a simple criteria used to illustrate the invention can be the presence of the query word or the frequency of the query word in the document. As further explained in the referenced paper, the system is usually enhanced by providing means for stemming the query word and searching for any document that contains a word that is a variant of the stem. Again, this is not important to the invention and the invention is usable with all such kinds of relevance-ranking, text retrieval computerized systems.

Figure 2:
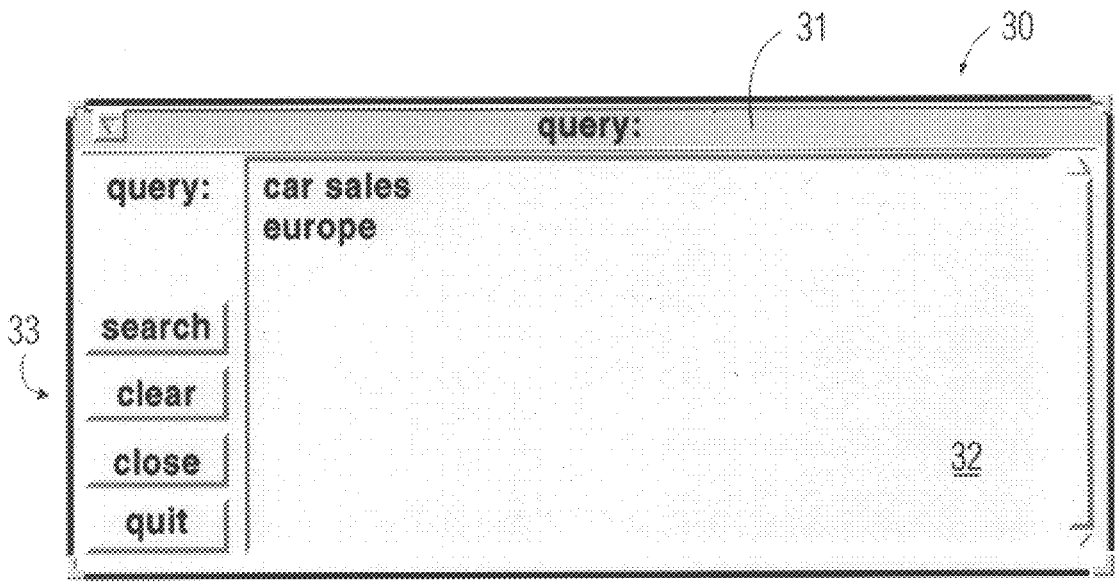
FIG. 2 is a one form of query window for a user interface in accordance with the invention in a relevance-ranking, full-text document retrieval system.

Assuming that the available system is of the type described in the referenced paper, then when a user begins a retrieval session a window or pane as illustrated in FIG. 2 would be displayed. The window 30 has a title bar 31 labelled "query", an editable section 32, and a column of control buttons 33. The user types into the editable section 32 the query words to be searched. In the example illustrated, three query words have been entered: car, sales and europe. Depending on the system, the positions of the words are or are not important. As described in the referenced paper, a "words" window 35 (FIG. 3) then appears. In the words window, the words are listed in a vertical column and next to each word is a weight indicator 37, referred to hereinbefore as the first indicator. Typically, the words are listed in accordance with their respective weight rankings; words with higher weights are listed earlier in the words window.

As mentioned earlier, the type of criteria used to search for and select those documents that match a query is not important to the invention. Similarly, it is also not important how the system determines the weights of the query words out of the query as entered by the user in the query window. In some systems, the user lists the most important word on the first line in the first position, modifiers for the word in second and higher positions, and words second in importance as the first word on a lower line. Thus, the manner in which the user entered the words shown in the query window 32 tells the computer how to weight the words in the words window 35. In other systems, the computer can estimate the weight of a word by its frequency in the query and relative abstractness or concreteness. Finally, in systems with stemming capabilities, not the weights of single words but of their stems instead are reflected: all words that have the same stem are mapped onto that stem for weight determination, and all those words are shown together on one and the same line in the words window.

In the present example, a slider is used as the first indicator 37 and the position of a button 39 on the slider indicates its weight, the higher weight words having buttons positioned more toward the right end of the slider. As in typical GUI interfaces, such as used in the windowing systems, the buttons 39 can be dragged by the user to different positions to selectively vary the weights imparted to the individual words. As will be appreciated, the weights determine in what ranking order the found documents should be listed. For example, suppose the user tells the computer to list only the 10 most important documents containing any of the query words. If the search engine locates 40 documents, each of which contains one or more of the query words, then the assigned weights determine which 10 of the 40 documents would be chosen and in what ranking order they should be presented or listed to the user.

In accordance with the invention, which is not taught in the referenced paper, in the words window, each word has uniquely associated with it a distinctive representation that is different for all of the words. In the present black and white display example, the distinctive representation is shading. Thus, the word "car" is displayed on a lightly shaded background 41 which also surrounds its adjacent slider 37. The word "europe" is displayed on a heavily shaded background 43 which also surrounds its adjacent slider 37. The word "sales" is displayed on a medium shaded background 45 which also surrounds its adjacent slider 37.

Figures 3, 8:
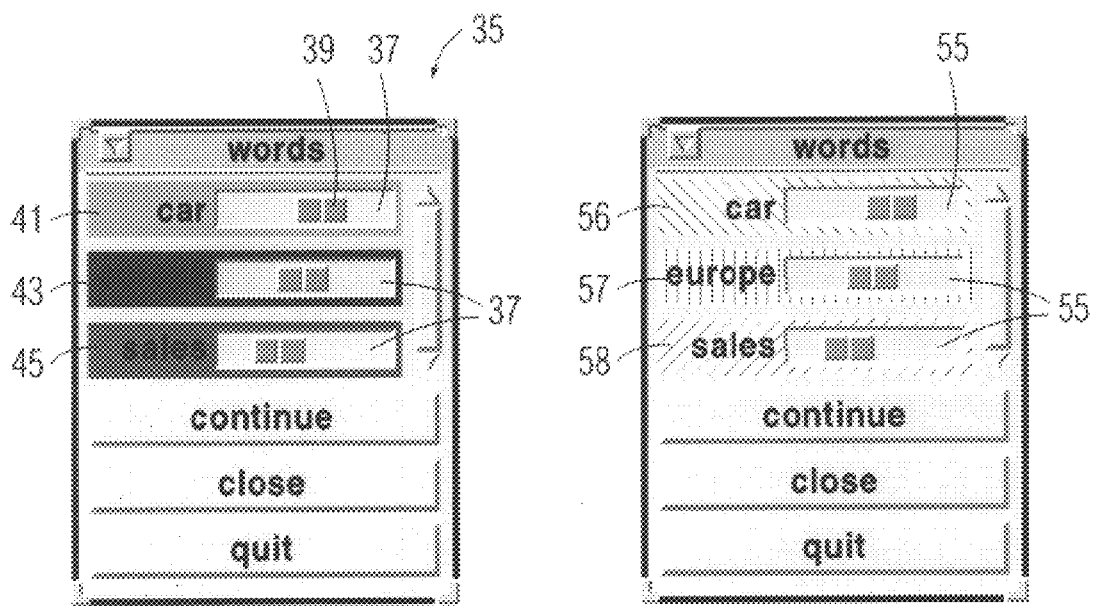
FIG. 3 is one form of a words window for a user interface in accordance with the invention in a relevance-ranking, full-text document retrieval system.
FIG. 8 is another form of a words window for a user interface in accordance with the invention in a relevance-ranking, full-text document retrieval system.
Figure 4:
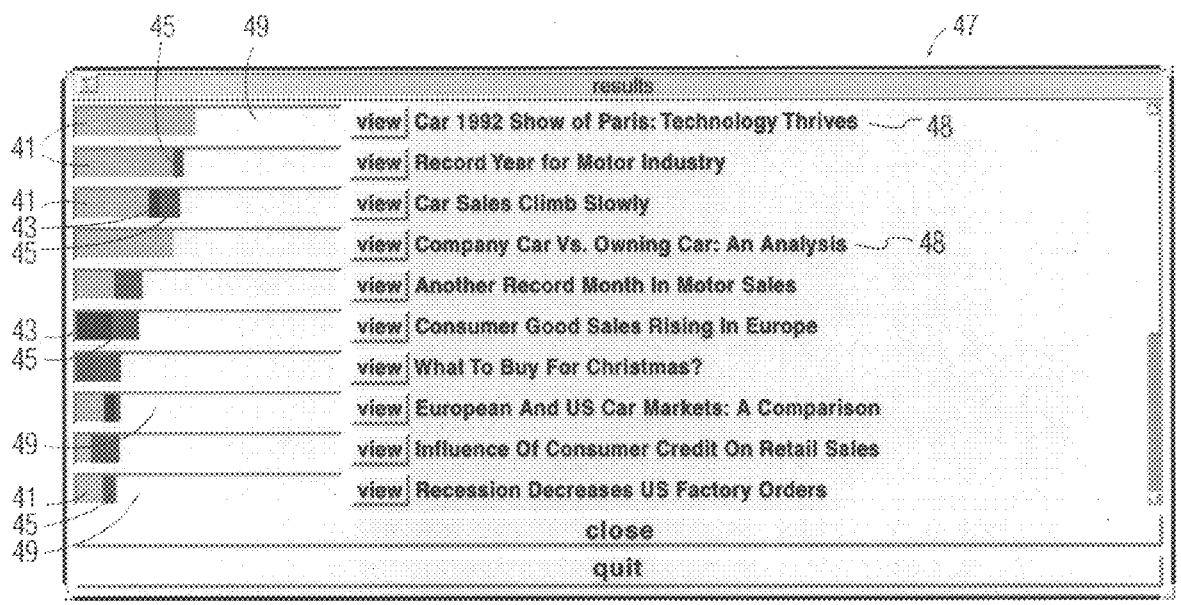
FIG. 4 is one form of a results window for a user interface in accordance with the invention in a relevance-ranking, full-text document retrieval system.

When the user clicks on the continue button, and after the retrieval engine has completed its task, the results are displayed in a results window 47 (FIG. 4). The results window lists in order of importance the headings or titles 48 of the documents found next to a view button, and, in accordance with the invention, a second indicator 49, in which is displayed the same distinctive representation, i.e., the shading, representing for the adjacent document the relative contributions of each of the query words. The same reference numerals as used for the shading in FIG. 3 are also used here. Thus, the user can tell at a glance which of the documents s/he may desire to peruse. The first document contains the word "car" only, but that word is very important in this document. The word "car" also occurs in the last document, however it is less important there. Also the word "sales" occurs in the last document, but that word is even less important therein than the word "car". For the third document from the top, all of the words "car", "sales", and "europe" occur in it, but the importance of those words for this document is high, medium, and small, respectively. The length of the shading uniquely associated with each word indicates the importance of that word in the adjacent document. If, for example, the interest of the user is in European sales, then the sixth document listed seems to be the most relevant because the words "europe" and "sales" are both of medium importance in this document. From the example in FIG. 4, the user can directly conclude that the first and fourth documents are only about cars, the seventh document is only about sales, and the third and eighth documents are about car sales in Europe.

As in the published system, the user can then obtain a full view of any of the listed documents by simply clicking on the adjacent view button, and a viewer window 52 (FIG. 5) pops up which displays the full text. In the prior art systems, it was known to highlight the query words in the full text document. In accordance with a further feature of the present invention, the query words are highlighted using the same distinctive representation associated with each query word. Thus, in the viewer window 52, in the second text line, the word "car" is presented on a lightly shaded background, the word "sales" on a moderately shaded background, and two lines further down the word "Europe" on a darkly shaded background, and so on throughout the text displayed.

As mentioned earlier, the invention is not limited to shading as the distinctive representation and other forms of distinctive representations can be used. FIG. 8 shows for each slider 55 of the type illustrated in FIG. 3 a distinctive representation in the form of unique hatchings 56, 57, 58, with each hatching style being reproduced in the corresponding results window 47 in the sliders 49 to indicate the importance of the respective query words in the listed documents in the same manner as is done by the shading.

As earlier mentioned, the most preferred distinctive representation is color, and since color is often depicted by hatching in patent drawings, FIG. 8 equally illustrates different colors such as red 56, blue 57 and green 58 associated with each of the query words, in which case, as before, the same colors would appear in the bars in the results window to indicate the relevance of each of the query words in the document, and in the viewer window the respective query words would be highlighted in their respective unique color.

Figure 6:
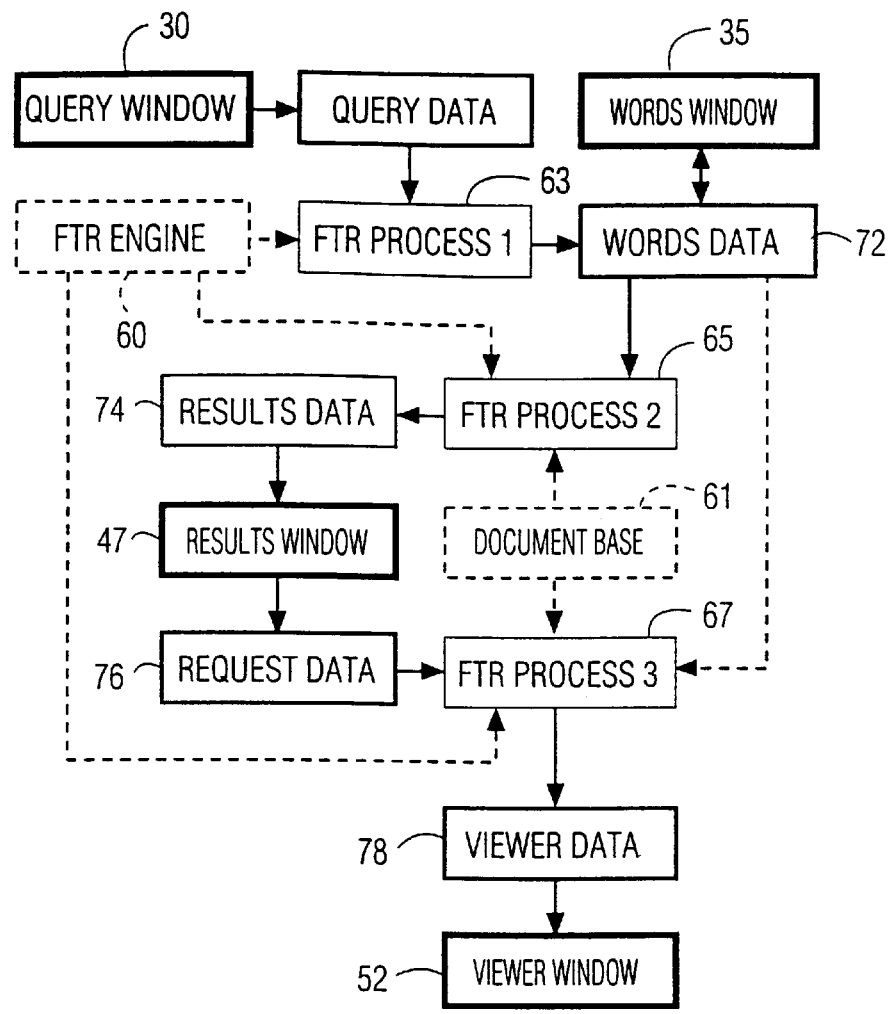
FIG. 6 is a block data flow structure diagram for one form of a user interface for a relevance-ranking, full-text document retrieval computerized system capable of displaying the windows of FIGS. 2–5.
Figure 7:
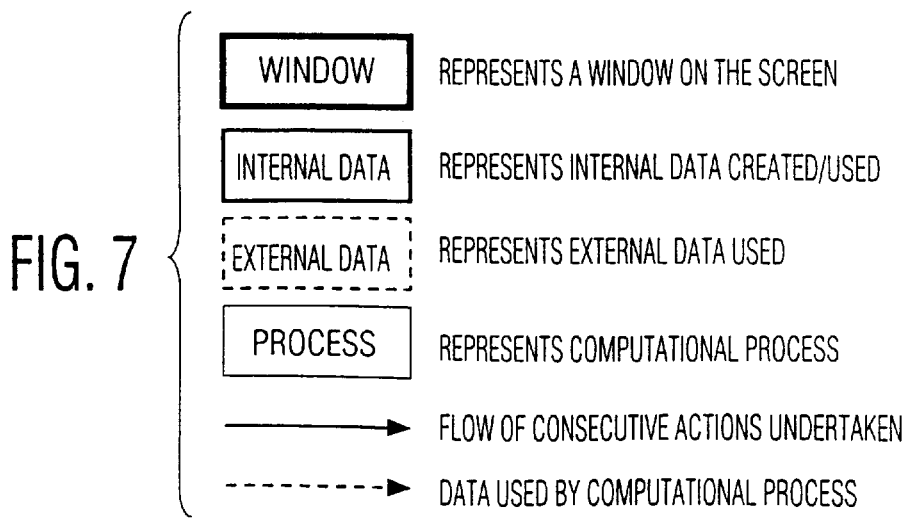
FIG. 7 illustrates the notation used for the blocks and arrows of the data flow diagram of FIG. 6.

Implementation of a system in accordance with the invention is straightforward as evidenced by the referenced paper and the many published papers and patents describing document retrieval systems. As one example, which is not meant to be limiting, FIG. 6 illustrates a data flow diagram for such a system. The notation used is explained in FIG. 7. The windows generated in the conventional manner as in all GUI systems has the same reference numerals as used before. FTR is an abbreviation for any known full-text retrieval engine (including auxiliary document data such as indexes) 60 which can be stored as software in memory 13 or accessed via a network. A document base 61 can be stored on disk 13 or accessed via a bulletin board or other commercial source. The FTR processes 63, 65, and 67 are routines that may be part of the FTR engine or as separate software routines.

A detailed description in the form of pseudocode for implementation of a system in accordance with the invention is given below with the understanding that the invention is in the displayed information viewable by the user and not in the details of how the system operates to retrieve documents containing query words supplied by a user.

Typically, each document in the document base would be preprocessed as follows. Using a stop word list (trivial words), the system removes each stop word from the document which contains one or more document words. Using a known stemming algorithm, the system replaces each remaining document word with its stem or document term.

The system can then calculate and store the term weight or term relevance of each document term. This can be done in many different ways that are well known in the art and is not important to the invention. For instance, the referenced paper describes one way of calculating relevance. In my paper published in Document Management, June 1992, Pgs. 5–7, published by Samsom BedrijfsInformatie, The Netherlands, I describe a preferred way of calculating relevance using a probabilistic or vector-space term-weighting retrieval model that can be used in a system of this type.

Real time processing of query text containing typically multiple words can be carried out as follows.

1. The user enters the query words in the query window 30.

2. Using a stop word list, the system removes each stop word from the query.

3. Using a known stemming algorithm, the system replaces each occurrence of each remaining query word with its stem or query stem to form a query data structure 70.

4. The system calculates the term weight or term relevance of each query term in a known manner with respect to the document base currently to be searched using any known routine 63 referred to herein as FTR process 1.

5. The system sorts the query terms on decreasing term weight and uniquely associates with each query term a unique color, shading or hatching or other distinctive representation to form the words data structure 72 made up of term items (query term weight plus all query words that stem to that query term plus distinctive representation). This is visually represented, for example, by the sliders 37 and colors 41, 43, 45 as in FIG. 3.

6. The system visually presents to the user a list of term items in the words window 35 in such manner that a one-to-one correspondence exists between all term item representations and all query terms. The term item representations are sorted on decreasing term weight of the corresponding query terms. Each term item representation shows:

i. the original query words that are associated with (were replaced by) the query term corresponding to the term item, ii. using, for example, a slider, each term weight of the query term corresponding to the term item, iii. the unique color or other distinctive representation associated with the query term corresponding to the term item.

7. If desired, the user can modify each term weight using the sliders in the words window 35, after which the system may do some renormalization of the term weights of the query terms and returns to step 5.

8. Using FTR process 2 65, the system calculates the similarity between the query and each document in the document base, in which the similarity is the sum of products of the current query term weights and the document term weight of the query terms (this process is explained in my above-mentioned paper—any other known relevance algorithm may be substituted).

9. The system sorts the documents on decreasing similarity and stores the results in the results data structure 74.

Figure 5:
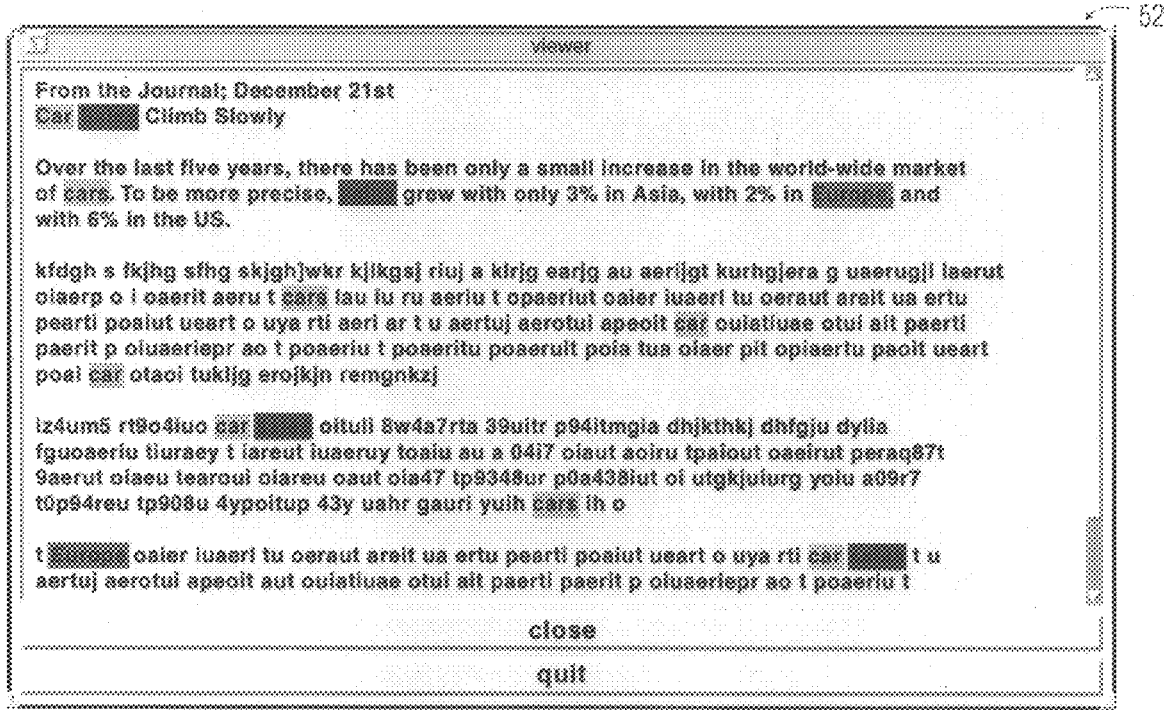
FIG. 5 is one form of a viewer window for a user interface in accordance with the invention in a relevance-ranking, full-text document retrieval system.

10. The system presents to the user a list of the result items in the results window 47 in such manner that there is a a one-to-one correspondence between all result items and all documents in the document base searched. The result items are sorted on decreasing similarities between the query and the documents corresponding to the result items. Each result item shows:

i. a stack of colored bars (when color is used as the distinctive representation), such as 49 in FIG. 4, of which the total length represents the value of the similarity between the query and the document corresponding to the result item, ii. a textual representation of the document corresponding to the result item, such as 48 in FIG. 5.

iii. for each result item, each color in its colored bar corresponds to a query term that is also a document term of the document corresponding to the result item; the length of each color piece in the colored bar represents the product of the query term weight and the document term weight of the common term that is uniquely associated with that color, such as 41, 43, 45 in FIG. 8. As the total of these individual products equals the similarity, the total of these color piece lengths equals the length of the bar stack.

11. The user can then select a result item from the results list by creating a requests data structure 76 and in a known manner the full text of the selected document is displayed in the viewer window 62.

12. In the viewer window 52, the system using viewer data 78 colors each document word associated with a query term with the color uniquely associated with the query term using any known process represented by block FTR process 3 67.

It will be understood that a user can always return if desired to an earlier step in the process for, say, re-entering a query in the query window 30, or to re-modify the term weights in the words window 35.

The invention is not limited to the sliders or bars as the first or second indicators. Other representations of numbers or ratios, such as actual numerics or pie charts, can be substituted.

Further, as mentioned, the invention is not limited to the ways described for calculating term weight or similarities. For example, a simple system can use calculations in which zero (0) means most relevant or most similar, in which case the sorting would be reversed.

Moreover, while the interface of the invention has its most important utility in a relevance-ranking, full-text document retrieval computerized system that employs a weighting model for the user or the computer to assign comparative relevances to the query terms, it can also be used in a much simpler system in which, for example, modifying the term weights is not possible, or in which no term weights are used at all. In the latter case, a words window would be unnecessary, and the distinctive representation uniquely associated with each query word could be directly presented in the query window 30 by coloring, for example, each query word with a different color when it is entered in the window. Then, each document that contains one or more of the query words would be listed in a results window with an indicator next to each document listed which by means of the same color or other distinctive representation uniquely associated with each query word indicates to the user the importance of that particular word in the document, which can be indicated by the length of a slider or by the intensity of a color or by any other easily observable and understandable means.

While the invention is most important for relevance-ranking full-text, document retrieval systems, it can also be used in systems which do not display the relative importance but only the presence of the query words in the result documents indicated by the presence of its distinctive representation in the results window, or in systems which do not provide full-text retrieval but only, for example, text retrieval through keywords in an indexing system or abstracts in an abstracts database.

While it is preferred that the display of information to the user during a user session be incorporated in individual windows or distinct panes, it will be understood that the invention is not so limited and if desired all the information can be displayed in one window or in separate parts of the same window.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A text retrieval system comprising:

memory means for storing a data base including text items;

means for accepting a user query;

processing means for organizing and querying the data base using at least one key word received in the user query, the processing means producing query results in a format, the format including a list of identified items, the identified items all containing at least one respective one of the at least one key word, the list including a respective indicator associated with each identified item, the respective indicator indicating the importance in the associated identified item of the at least one respective one of the at least one key word; and display means for displaying the query results in the format.

2. The system of claim 1 wherein each respective indicator is displayed in a respective region of the display means, which respective region has at least one sub-region assigned to a relevant one of the at least one key word.

3. The system of claim 2 wherein a respective size of each of the at least one sub-region indicates a frequency in the associated item of the relevant one of the at least one key word.

4. The system of claim 2 wherein each of the at least one key word is assigned a respective color marking and each sub-region is designated by the respective color marking assigned to the relevant one of the at least one key word.

5. The system of claim 2 wherein each region is rectangular and each sub-region is also rectangular.

6. The system of claim 2 wherein the list comprises a first column that includes the respective regions and a second column that includes respective titles for each identified item, the first and second columns being arranged so that the respective region and title for a given identified item are in a respective row assigned to the given identified item.

7. The system of claim 1 wherein the items are full text documents.

8. The system of claim 1 wherein the items are abstracted documents.

9. The system of claim 1 wherein importance is determined by how many times each of the at least one keyword appears in each of the items.

10. The system of claim 1 wherein the processor generates first, second and third windows for display on the display means, the first window being for input of a user query, the second window being for communicating to the user what aspects of indicators have been assigned to what key words, and the third window being for displaying the format.

11. The system of claim 1 wherein each respective indicator is a respective region of the display means having at least one sub-region assigned to a relevant one of the at least one key word;

each of the at least one key word is assigned a respective color marking;

a respective size of each of the at least one sub-region indicates the frequency of the relevant one of the at least one key word in the associated item; and each sub-region is designated by the respective color marking assigned to the relevant one of the at least one key word.

12. The system of claim 1 further comprising retrieval and formatting software for running on the processor and thus achieving the listed processor functions.

* * * * *